US010769682B1

(12) United States Patent
McDonald

(10) Patent No.: US 10,769,682 B1
(45) Date of Patent: Sep. 8, 2020

(54) TOUCH AND HOLD SYSTEM AND METHOD TO ACTIVATE AND CONTROL MOBILE CONTENT

(71) Applicant: James Trevor McDonald, Crane, TX (US)

(72) Inventor: James Trevor McDonald, Crane, TX (US)

( * ) Notice: Subject to any disclaimer, the term of this patent is extended or adjusted under 35 U.S.C. 154(b) by 0 days.

(21) Appl. No.: 16/568,011

(22) Filed: Sep. 11, 2019

(51) Int. Cl.
*G06Q 30/02* (2012.01)
*G06F 3/0346* (2013.01)
*G06F 3/0488* (2013.01)
*G06F 3/0484* (2013.01)

(52) U.S. Cl.
CPC ....... *G06Q 30/0277* (2013.01); *G06F 3/0346* (2013.01); *G06F 3/0488* (2013.01); *G06F 3/04842* (2013.01); *G06Q 30/0267* (2013.01)

(58) Field of Classification Search
USPC .................................................. 705/14, 319
See application file for complete search history.

(56) References Cited

U.S. PATENT DOCUMENTS

| | | | | |
|---|---|---|---|---|
| 2013/0053107 A1* | 2/2013 | Kang | ................ | G06F 3/04883 455/566 |
| 2016/0371751 A1* | 12/2016 | Cohen | ................ | G06F 3/04842 |
| 2017/0262896 A1* | 9/2017 | Tsai | .................... | G06Q 30/0255 |
| 2018/0336234 A1* | 11/2018 | Jatzold | ................. | G06F 3/0484 |
| 2019/0342329 A1* | 11/2019 | Turgeman | ............. | H04L 67/306 |

* cited by examiner

*Primary Examiner* — Luis A Brown
*Assistant Examiner* — Richard G Reinhardt
(74) *Attorney, Agent, or Firm* — Lloyd & Mousilli

(57) ABSTRACT

A user interface system, including a user device. The user device includes a processor, a display that interacts with the processor to display a user interface including a site content and a first interactive object. The processor is operative to expand the first interactive object and transform the first interactive object to a content object displayed on the display, when a user touches and holds the first interactive object for a predetermined period of time. The processor is also operative to terminate, contract, and transform the content object for the display to display a second interactive object, the second interactive object having a secondary content trigger, upon the user releasing the holding of the first interactive object after the predetermined period of time.

19 Claims, 8 Drawing Sheets

TOUCH AND HOLD SYSTEM AND METHOD TO ACTIVATE AND CONTROL MOBILE CONTENT

FIELD

The present disclosure relates to advertising systems and methods, specifically to link-based advertising systems and methods for use with touch-screen enabled devices.

BACKGROUND

Link-based advertising is used to generate interest and traffic to websites and other similar platforms. Generally, a banner ad is displayed on a page/app that is being experienced by a user. The banner ad includes graphics/information intended to entice the user to select the ad, generally by clicking/touching the banner itself, which then opens a website/app associated with the banner ad for further engagement.

Various types of advertising exist online, including but not limited to: pop up ads, banner ads, native ads, bumper ads, video ads, expandable ads, and interstitial ads. These ads allow for third parties to provide content through websites and applications that are used/visited by users, generally in an effort to entice those users to interact with the third party's own website or application. When selected these ads generally open a new page/application, sometimes taking the user away from their originally desired content and sometimes leaving the original page open but inactive.

Examples of references related to the present disclosure are listed below: U.S. Pat. Nos. 7,647,609; and 8,666,818; and US Patent Application Nos.: 20100223094; 20110288913; 20180185240; 20150193951; and 20120235938.

The related disclosures suffer from a number of disadvantages, including but not limited to failing to provide choice, being susceptible to bot traffic inflating ad analytics, failing to collect data related to attention by users, being limited in freedom, failing to collect accurate information related to user interaction, not providing valuable metrics, not easily tailored for legal compliance, failing to create a secondary economy, not allowing for choice of the user after initial presentation of information, and requiring too much commitment from users on link selection.

What is needed is a system and/or method that solves one or more of the problems described herein and/or one or more problems that may come to the attention of one skilled in the art upon becoming familiar with this specification.

SUMMARY

This section provides a general summary of the disclosure and is not a comprehensive disclosure of its full scope or all of its features. The present disclosure provides for a user interface system, including a user device. The user device includes a processor, a display that interacts with the processor to display a user interface including a site content and a first interactive object. The processor is operative to expand the first interactive object and transform the first interactive object to a content object displayed on the display, when a user touches and holds the first interactive object for a predetermined period of time. The processor is also operative to terminate, contract, and transform the content object for the display to display a second interactive object, the second interactive object having a secondary content trigger, upon the user releasing the holding of the first interactive object after the predetermined period of time.

In another embodiment, an advertising method includes displaying, by a display, a user interface including a site content and a first interactive object expanding, by the user interface, the first interactive object and transforming the first interactive object into a content object displayed on the display, when a user touches and holds the first interactive object for a predetermined period of time, and terminating and contracting the content object and displaying a second interactive object, the second interactive object having a trigger including a secondary content, upon the user releasing the holding of the first interactive object after the predetermined period of time.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

A more particular description of the invention briefly described above will be rendered by reference to specific embodiments that are illustrated in the appended drawing(s). It is noted that the drawings are not to scale. The drawings are mere schematics representations, not intended to portray specific parameters of the disclosure. Understanding that these drawing(s) depict only typical embodiments of the disclosure and are not, therefore, to be considered to be limiting its scope, the disclosure will describe and explain the various systems, devices, and methods with additional specificity and detail through the use of the accompanying drawing(s), in which.

Corresponding reference numerals indicate corresponding parts throughout the several views of the drawings.

DETAILED DESCRIPTION

Figure 1:
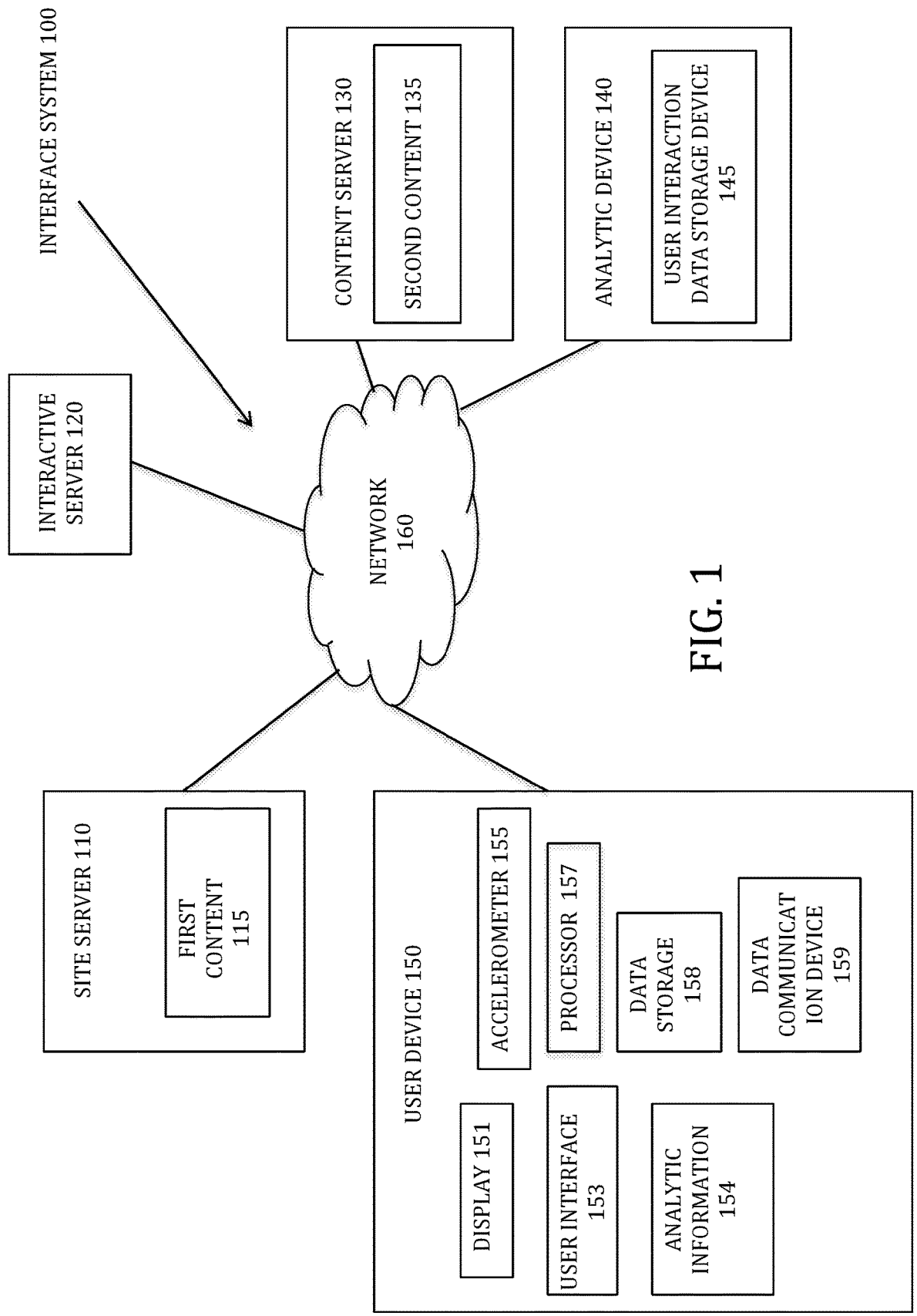
FIG. 1 is a network diagram showing an interface/touch and hold system ("T&H System"), according to one embodiment.

For the purposes of promoting an understanding of the principles of the disclosure, reference will now be made to the exemplary embodiments illustrated in the drawing(s), and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would occur to one skilled in the relevant art and having possession of this disclosure, are to be considered within the scope of the disclosure.

Reference throughout this specification to an "embodiment," an "example" or similar language means that a particular feature, structure, characteristic, or combinations thereof described in connection with the embodiment is included in at least one embodiment of the present disclosure. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims or may be learned by the practice of the disclosure as set forth hereinafter.

FIG. 1 is a network diagram showing an interface system 100, or a touch and hold system ("T&H System"), according to one embodiment of the disclosure. There is shown a network 160 that allows communication amongst a site server 110 (or site web server), an interactive content server 120 (or interactive web server), a content server 130 (or content web server), an analytic device 140, and a user interface device 150. The above elements are connected to, and communicate with each other, by a network 160.

The illustrated network 160 includes any electronic communications means that incorporates both hardware and software components. Communication among the elements in accordance with the present system or device may be accomplished through any suitable communication or connection channels, such as, for example, a telephone network, an extranet, an intranet, Internet, point of interaction device (point of sale device, personal digital assistant, cellular phone, kiosk, etc.), online communications, off-line communications, wireless communications, transponder communications, Local Area Network (LAN), Wide Area Network (WAN), networked or linked devices and/or the like. Moreover, although the system may be implemented with Transmission Control Protocol/Internet Protocol (TCP/IP) communications protocols, the system may also be implemented using other protocols, including but not limited to Internetwork Packet Exchange (IPX), Appletalk, Internet Protocol Version 6 (IPv6), Network Basic Input/Output System (NetBIOS), Open Systems Interconnection (OSI) or any number of existing or future protocols. If the network is in the nature of a public network, such as the Internet, it may be advantageous to presume the network to be insecure and open to eavesdroppers. Specific information related to the protocols, standards, and application software utilized in connection with the Internet may be found in, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

The illustrated site server 110 provides a first content 115 (e.g., site content) sought for by the user. This site server 110 may provide search engine content, or general web content from any website or application. The first content 115 need not be a website; it may be an application on a smartphone.

The illustrated interactive server 120 is in functional communication with the site server 110 in a manner similar or identical to how banner ads (i.e., mobile banner ad, or banner) are served on websites and smartphone/table applications. The interactive server 120 provides an interactive object 230 (See FIG. 2) to the user device 150 in association with the first content 115 provided by the site server 110.

The illustrated content server 130 provides a second content 135 directly associated with the interactive object 230 of the interactive server 120. Having this second content 135 provided by a server different from the interactive server 120 allows for bifurcation of control and responsibility over the operation of the interactive object 230, as compared to a case where the second content 135 is to be delivered only by the interactive object 230. It also allows for rapid delivery of the object and allows the object to be small, in that it can be delivered without the second content 135, so the second content 135 can be loaded as needed by the user device 150.

It is noted that the above description is an example of where contents and their source may be, and the source where contents come may vary. That is, content that is sent to the user device 150, (e.g., first content 115 or second content 135) may come from other sources besides the site server 110 or content server 130. These contents may be sent over the network 160 from different devices and servers not illustrated here to be displayed on user device 150.

The illustrated analytic device (140) receives analytic information 154 from the user device 150 in real-time (or not) in association with interactivity with the interactive object 230. It may store the analytic information 154 in a user interaction data storage device 145 and may deliver that stored analytic information 154 to providers of the interactive object content for use in measuring the effectiveness of a campaign or otherwise as appropriate to their purposes.

The illustrated user device 150 will generally include a capacitive display 151 on which a user interface 153 such as a Graphical User Interface (GUI) is displayed, an accelerometer 155, and a web browser/application along with communication hardware/software installed in the interface device 150 to functionally communicate over the network 160. Such a user device 150 may be computing devices (thought they may be dumb terminals) and may be smartphones, tablets, personal computers, or the like or combinations thereof and may include computing components, including but not limited to processor(s) 157, data busses, data storage(s) 158, operating system(s) installed in the hardware, and the like.

An accelerometer 155 is generally an electromechanical device used to measure acceleration forces. Such forces may be static, like the continuous force of gravity or, as is the case with many mobile devices, dynamic to sense movement or vibrations. They generally operate using piezoelectric sensors and/or capacitive sensors that react to acceleration and provide a voltage or change in voltage in relation to the amount of acceleration. These sensors are generally provided on multiple axis so that the direction of acceleration is known, not just the amount. Where the accelerometer 151 measures the static gravitational acceleration, the orientation of the device in relation to the direction of gravity, or along a vertical axis may be known. This allows one to know the tilt or angle of the user device 150 from a horizontal plane that is perpendicular to the vertical axis. By implication, one may observe tilting and changes in tilt that indicate if the user device 150 is resting on a flat surface within the horizontal plane (e.g. a table) or if the user device 150 is being held by a user (e.g. tilted for viewing together with very small acceleration due to tremors or shifting positions of the user's hand). Accordingly, an interface system 100 (T&H system) may prevent an interactive object 230 shown in FIG. 2 from expanding if the user device 150 is not being held within an angle range (e.g. between two of about 5, 10, 15, 20, 25, 30, 35, 40, 45, 50, 55, 60, 65, 70, 75, 80, 85 degrees from level with gravity) and/or if the user device 150 does not show small accelerations due to being held statically in the hand of a user. Alternatively, the interactive object 230 may still expand, but the analytic data associated with the interactive object 230 may be flagged so that it maybe treated differently (e.g. no pay-per click since the view was not verified as being with a live person).

As those skilled in the art will appreciate, any computers discussed herein may include an operating system, such as but not limited to: Android, iOS, BSD, IBM z/OS, Windows Phone, Windows CE, Palm OS, Windows Vista, NT, 95/98/2000, OS X, O52; QNX, UNIX; GNU/Linux; Solaris; MacOS; and etc., as well as various support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present device or system may employ various integrated circuit components or hardware, (e.g., memory elements, processing elements, logic elements, scripts, look-up tables, and the like), which may carry out a variety of functions under the control of one or more microprocessors or other control devices. Similarly, the software elements of the present device or system may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements. Further, it should be noted that the present device or system may employ any number of varied techniques for data transmission, signaling, data processing, network control, and the like. Still further, the present device or system may detect or prevent security issues with a client-side scripting language, such as JavaScript, VBScript or the like.

Further, data storage 158 described herein may include databases and/or data files. There may be one or more hardware memory storage devices, which may be, but are not limited to, hard drives, flash memory, optical discs, Random Access Memory (RAM), Read-Only Memory (ROM), and/or tapes. A non-limiting example of a database is Filemaker Pro 11, manufactured by Filemaker Inc., 5261 Patrick Henry Dr., Santa Clara, Calif., 95054. Non-limiting examples of a data storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

The communication systems (hardware and/or software) of the servers/devices described herein provide communication capabilities, such as wireless communication, to the modules and components of the system and the components and other modules described herein. There may be one or more hardware devices such as a network card, system bus, or wireless communication module that may communicate with a computerized network. The communication system may provide communication between a wireless device, such as a mobile phone, and a computerized network and/or to facilitate communication between a mobile device and other modules described herein. The communication system may have a component thereof that is resident on a user's mobile device. Non-limiting examples of a wireless communication module may be but not limited to: a communication module described in U.S. Pat. No. 5,307,463, issued to Hyatt et al.; or a communication module described in U.S. Pat. No. 6,133,886, issued to Fariello et al., which are incorporated for their supported herein.

The processing systems (hardware and/or software) (i.e., processor 157) of the servers/devices described herein provide and/or carry out operational instructions and commands to/from the modules and components of the system. The processing system is in communication with the modules and components of the system (and/or other modules described herein) and provides managerial instructions and commands thereto. The source of such instructions/commands may be from one or more other modules described herein and/or through interactions between one or more other modules described herein. The processing system sets parameters and settings for each module and component of the system. Non-limiting examples of a processing system may be a control module described in U.S. Pat. No. 5,430, 836, issued to Wolf et al.; or a control module described in U.S. Pat. No. 6,243,635, issued to Swan et al. which are incorporated for their supporting teachings herein. A control module may include but is not limited to a processor, a state machine, a script, a decision tree, and the like.

In one non-limiting embodiment, there are a plurality of servers 110, 120, 130, 140 with a user interactive object 230 linked to content objects, and a user interaction data storage device 145 located inside the analytic device 140 for storing metrics.

In another non-limiting embodiment, there is an interface system 100 (touch and hold system) with accelerometer data generated by the accelerometer 155 that proves human interaction and gives choice when providing preview content.

In still another non-limiting embodiment, and as will be described in further detail, there is a mobile ad tracking system that tracks user interaction through constant interaction and gives sponsors a new way to present their brands, while at the same time centering this process around the user experience, so that that user does not feel that they are being invade in their time or their screen real-estate. When the user touches and holds an interactive banner, an ad pops up for a predetermined time period (e.g., about 8-10 seconds) and continues to play as long as the user has their finger in contact with the screen. The ads can be in any style or format (video, animation, 3D, etc.). The above-described touch and hold banner interactivity gives the user a new experience while at the same time it helps the advertiser gain a higher click-through rate from a more valuable ad technique.

There may additionally be a Software Development Kit (SDK) that works across multiple platforms. There may be activation through the capacitive sensors of mobile devices to activate it. Tracking of user interaction information may include accelerometer data from the operation of the accelerometer 155 so one is able to track what angle the user device 150 is at. Such may give the advertiser much more eccentric and personable metrics of the viewer, thereby helping them to home in on not only what the users want, but what they don't want. The SDK may track how many seconds they watch, via the touch-and hold mechanic. There may be a plurality of applications for such an SDK system, including but not limited to: ads, surveys, and fund-raising.

Figure 2:
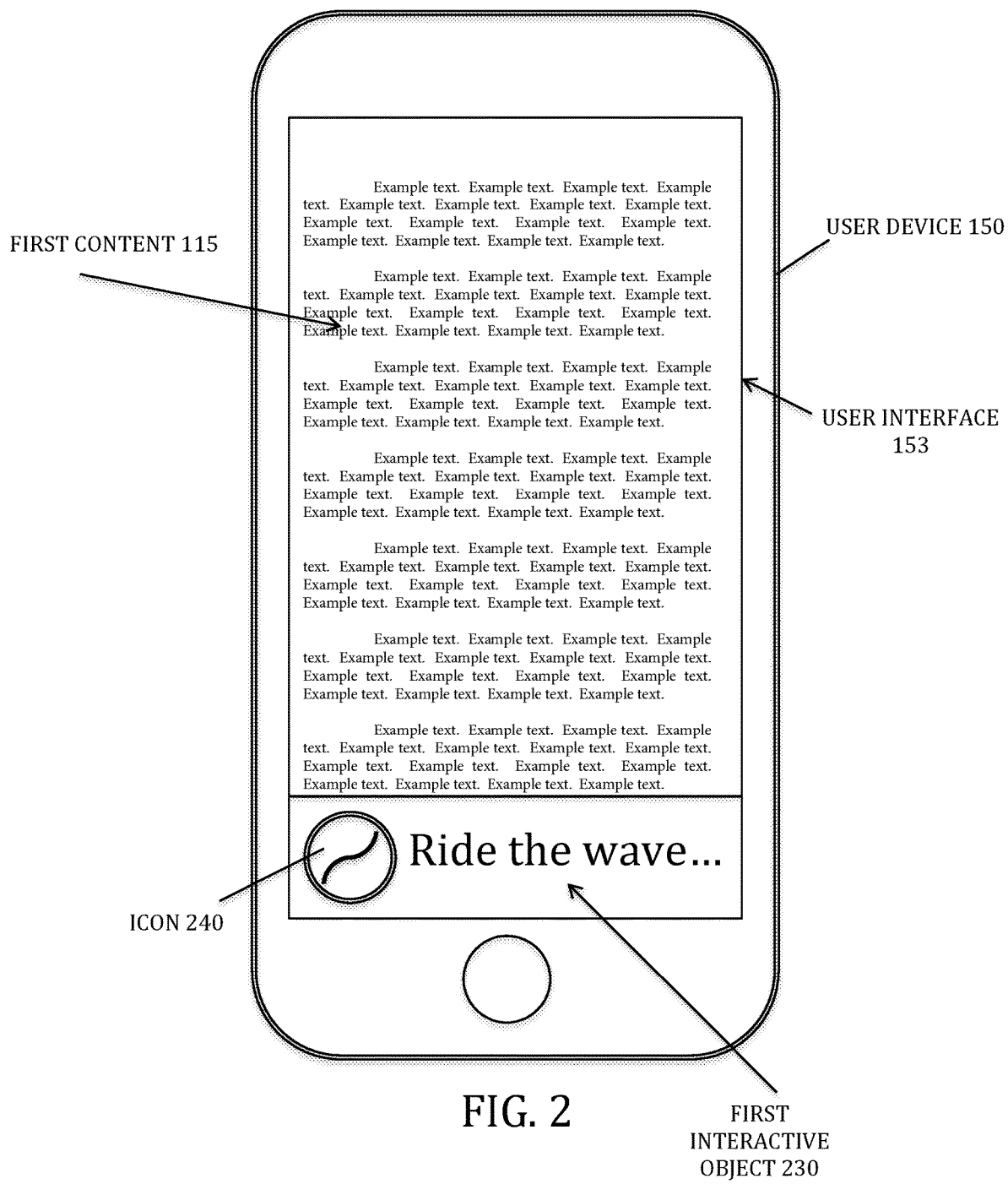
FIG. 2 illustrates a touch-screen enabled device showing a banner ad of a T&H System, according to the one embodiment.
Figure 3:
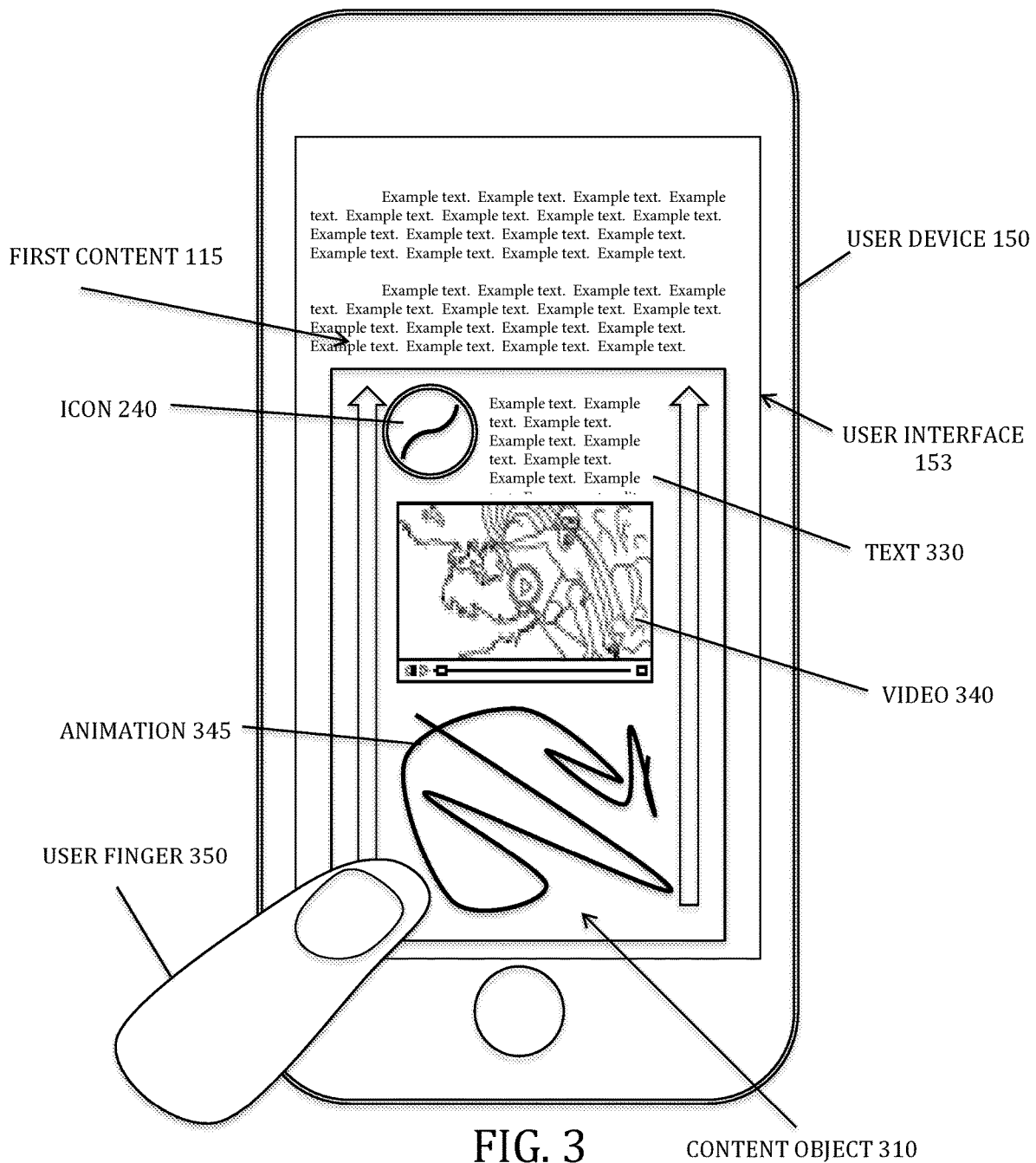
FIG. 3 illustrates a touch-screen enabled device showing a user finger touching and holding a banner ad of a T&H System, according to the one embodiment.
Figure 4:
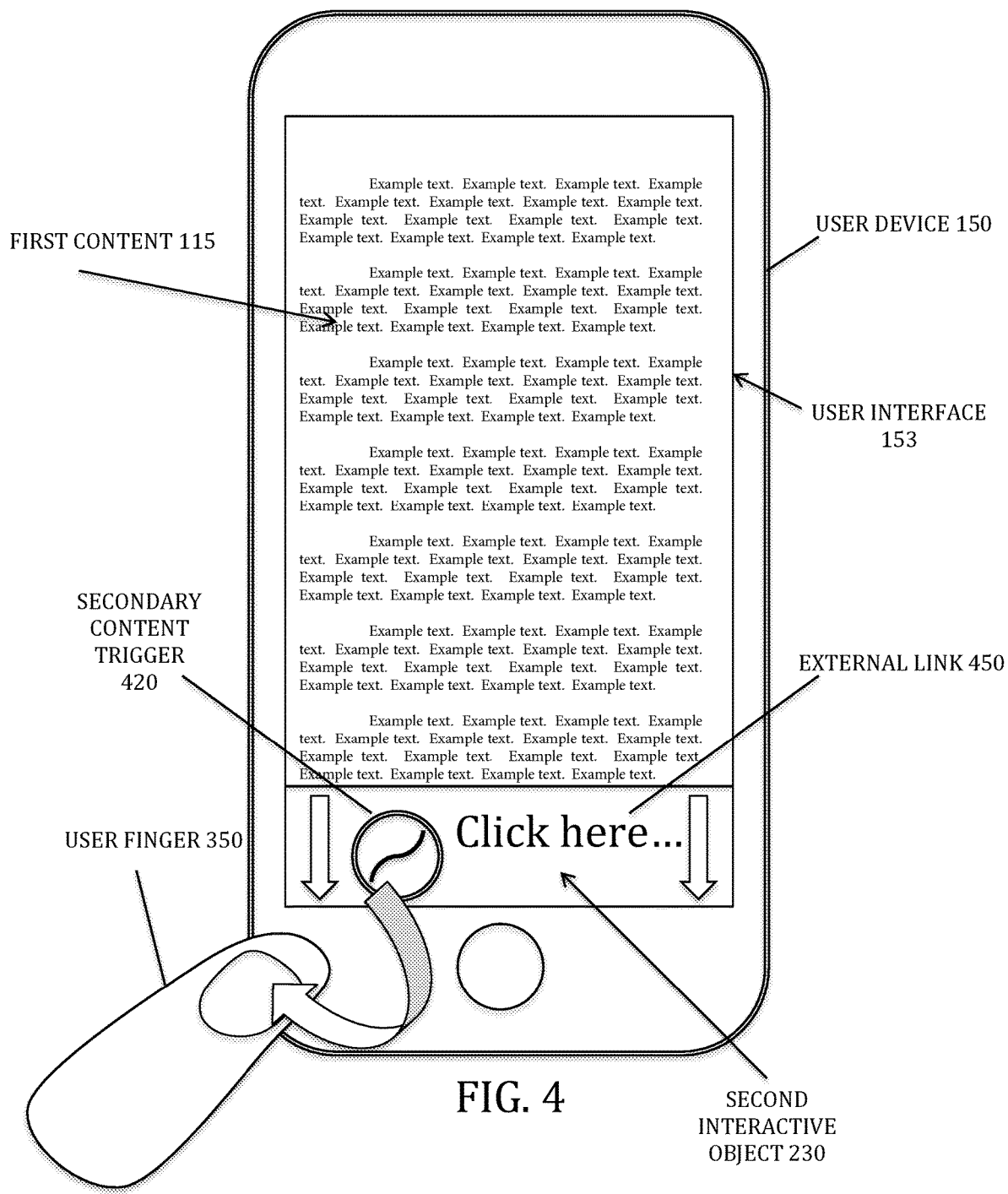
FIG. 4 illustrates a touch-screen enabled device showing a user finger having just released a touch and hold on a banner ad of a T&H System, according to the one embodiment.

FIGS. 2-4 illustrate a touch-screen enabled user device 150 showing a T&H banner ad of an interface system 100 (T&H System), according to one embodiment. Looking specifically to: FIG. 2, there is a user device 150 (e.g. a smartphone) with the user interface 153 showing the first content 115 along with a first interactive object 230 (e.g., banner ad) of the interface system 100 (e.g., T&H system). Also, referring specifically to FIG. 3, a user finger 350 touches and holds the position for a time duration on the first interactive object 230 (e.g., banner ad) of the interface system 100 (e.g., T&H System) displayed on the user device 150. Further, referring specifically to FIG. 4, there is a smartphone showing the user finger 350 having just released a touch and hold on the first interactive object 230 (e.g., banner ad) of the interface system 100 (e.g., T&H System), each according to one exemplary embodiment.

In more detail, and referring to FIG. 2, the user device 150 has its user interface 210 display the site content 220 and having the first interactive object 230 displayed in association with the site content 220. The illustrated user device 150 may be a smartphone with a capacitive display 150 (touch screen) displaying the GUI that allows the user to make selections displayed on the display 153 by touching the display 153 with their finger or a stylus.

The illustrated user interface 210 (e.g., GUI) enables a user to interact with the functions of an app through graphical icons and other visual indicators. The user interface 210 receives input from the user and displays output to the user and as such may submit instructions from the user to the system and may receive feedback from the system with respect to its operation. The user interface 210 exists in the context of the user device 150 used by a user. As discussed previously, and referring back to FIG. 1, the user device 150 generally includes the processor 157 or processing circuitry, RAM (not shown), the data storage 158 (e.g., hard, floppy, flash memory, ROM, and/or CD-ROM disk, drives, etc.), data communications device 159 (e.g., modems, network interfaces, transceivers, cellular network interfaces, etc.), the display 153 (e.g., CRT, LCD display, etc.), and input devices (e.g., touch screen, buttons, mouse pointing device, keyboard, CD-ROM drive, etc.) (not shown). It is envisioned that attached to the user device 150 may be other devices, such as ROM, a video card, bus interface, printers, etc. (not shown). Those skilled in the art will recognize that any combination of the above components, or any number of different components, peripherals, and other devices, may be used with the user device 150.

The user device 150 operates under the control of an operating system (OS). The operating system is generally booted into the memory of the user device 150 for execution when the user device 150 is powered-on, reset, or otherwise activated. In turn, the operating system then controls the execution of one or more applications.

An application, including the OS, can include a GUI, which facilitates interaction of the user with the application. The GUI includes instructions which, when read and executed by the processor 157 of the user device 150, cause the GUI to perform the steps necessary to configure and/or operate the GUI of the application.

The illustrated site content 220 may be of any kind, style, purpose, and the like, including but not limited to text, as illustrated, but also including but not limited to graphics, video, audio, interactive fields, games, sensor displays, and the like and combinations thereof.

The illustrated first interactive object 230 is shown in FIG. 2 as a banner ad with an 240 to the left (a wave icon) and text in the middle ("ride the wave . . . ") inviting the user to interact therewith. In FIG. 3, the interactive object 230 is expanded and transforms into a content object 310 on the touch and hold from the user finger 350 of the user and thereby displays the expanded content object 310 shown (including the wave icon 240, text 330, a video 340, and an animation). The illustrated expanded content object 310 pushes the site content 220 up to make room for the expanded content object 310, but the expanded content object 310 may overlay the site content instead. The site content 220, however, does not leave and disappear (i.e., is not completely covered) from the user interface 210 displayed on the display 153 of the user device 150, and the user is not shunted to a different page while the expanded content object 310 plays. In other words, the site 220 remains on the user interface 210 of the user device 150 for the user to see. Therefore, the user does not feel like they have lost their place or been taken somewhere else.

Shifting now to FIG. 4, the expanded content object 310 terminates when the user finger 350 lets go from touching and holding the first interactive object 210 displayed on the user interface 210 on the display 153 of the user device 150, and the content object 310 returns to a smaller size and transforms into a second interactive object 410. (i.e., the illustrated version of the content object 310 returns to the same size as the first interactive object 230 (i.e., the original banner ad) and transforms into the second interactive object 410, but returning to exactly the same size is not required). The smaller second interactive object 410 displayed as a post-touch banner is different from the original banner, of the first interactive object 230, while it still shows the wave icon 240, there is now new/different text ("click here . . . ") which has different functionality. For example, this text may provide an external link 450 to go to a new/different webpage. The displayed wave icon 240 may also serve as secondary content trigger 420 that is operated when the user finger 350 touches the wave icon 240 again, thus allowing the user to experience more expanded content object 310 once again, or choosing to go to the content provider's landing webpage page by selecting the external link 450).

In other words, referring to FIGS. 2-4, in operation a user visiting a website (that is served from the site server 110) is shown the first interactive object 230 (See FIG. 2) that expands when the user touches and holds that touch on the first interactive object 230 displayed on their display 153 located on the user's user device 150. The expansion may be contingent on the user device 150 being inclined at a particular range of angles from a horizontal plane, thereby assuring that it is likely that the user device 150 is being held by a person's hand, thus improving the quality of data collected by the analytic device 140 and also reducing vulnerability of the interface system 100 to bots, crawlers, etc. The expanded first interactive object 230, which transforms and becomes a content object 310, contracts when the user releases the touch. This way, any additional first content 115 provided to the user only persists as the user continues to touch the first interactive object 230. The first interactive object 230 may transform into a different second interactive object 410 after the touch and hold of the first interactive objet 230 is released by the user, for additional/different interactivity. This may include, but not limited to, a normal banner ad or the second interactive object 410 with the secondary content trigger 420 and the external link 450 that opens a new landing webpage page upon selection by the user.

Analytics related to the touch and hold experience may further be collected by the user device 150 and sent to the analytics device 140.

Based on the interface system 100 and its operations described above, content providers may be more certain that their content is reaching real people. Also, the interactivity of that content for the users is greatly enhanced, while not requiring that the user commit to opening a new webpage on selection of the object that blocks the original webpage the user was looking at, or fully experiencing the expanded content. This is because at any given time, the user can just let go to stop playing the expanded content object 310 displayed on the display 151 of the user device 150. By not pressuring the user to fully commit his time to see the expanded content object 310 for the entire duration that it is displayed on the display 151, the likelihood of the user interacting with the original first interactive object 230 is enhanced.

Figure 5:
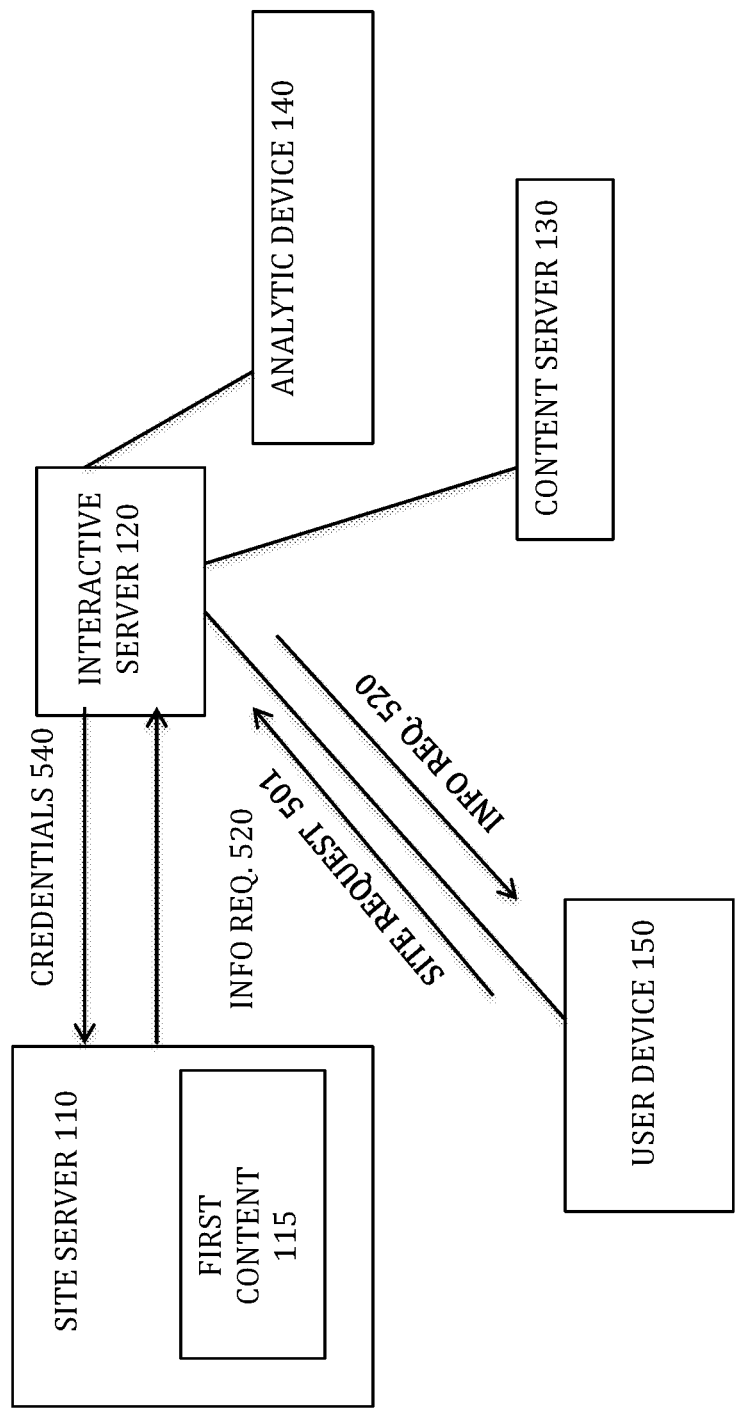
FIG. 5 is a system diagram of a T&H System, according to the one embodiment.
Figure 6:
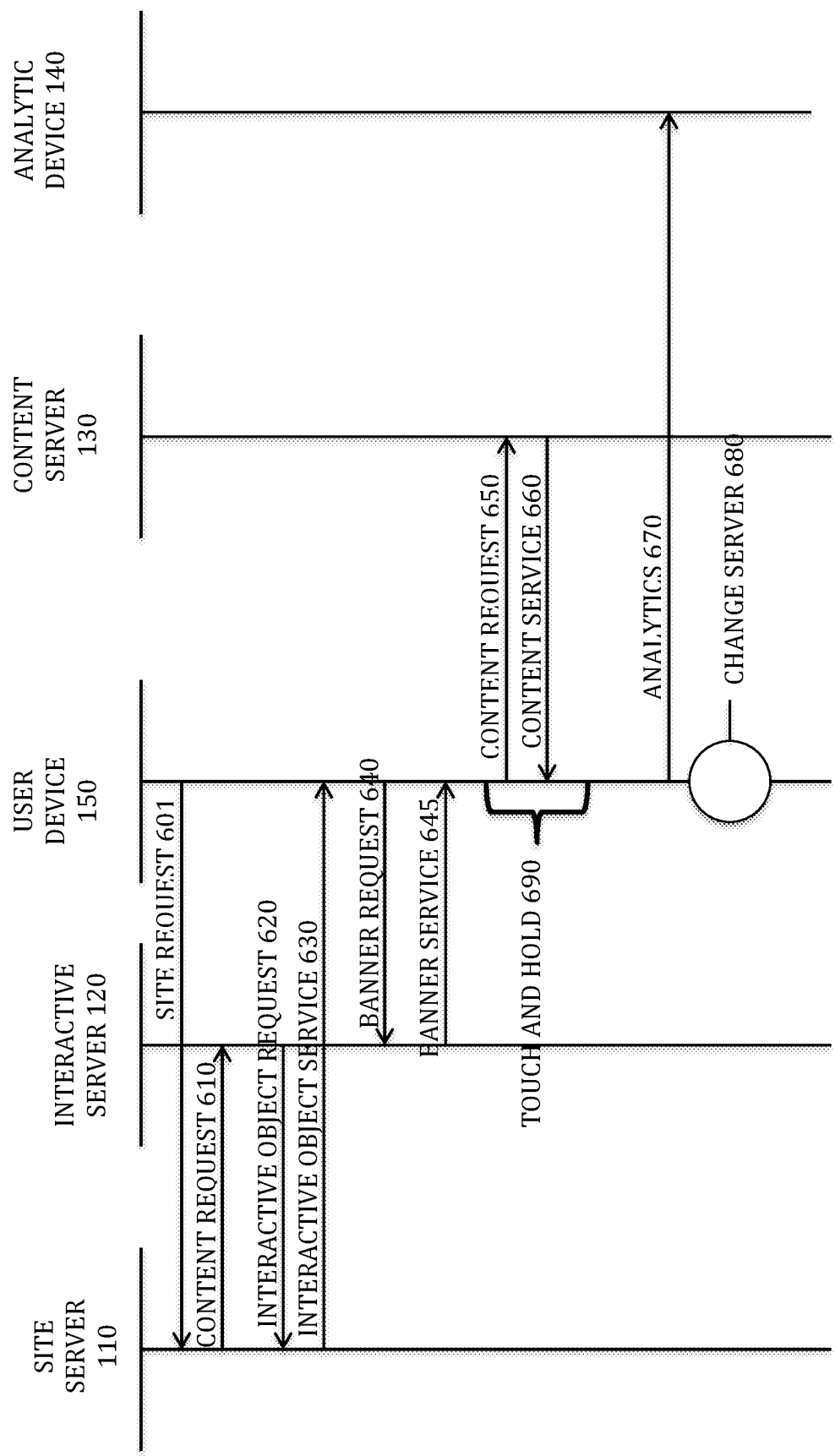
FIG. 6 is a sequence diagram of operation of a T&H System, according to the one embodiment.
Figure 7:
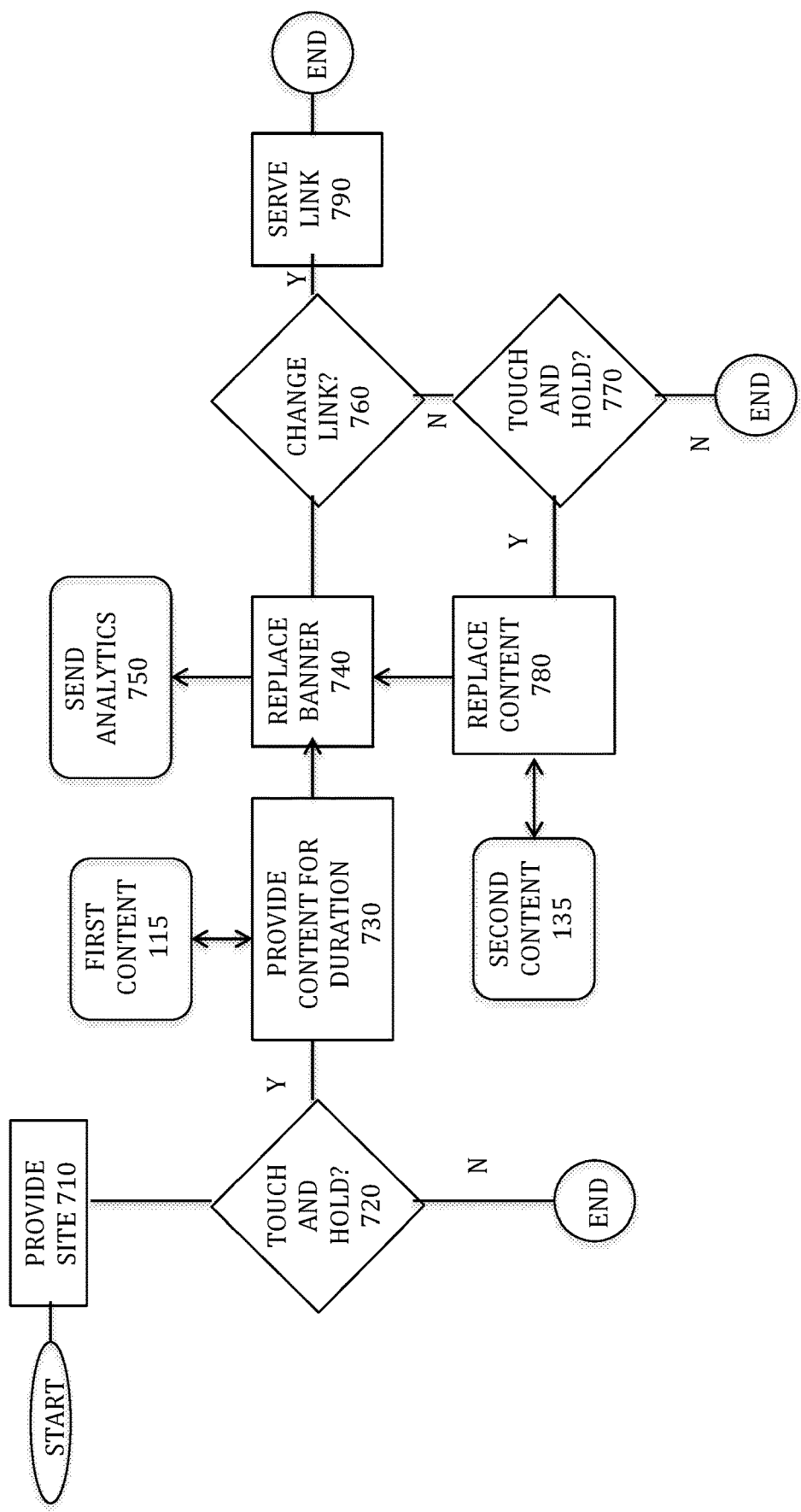
FIG. 7 is a flow chart showing a method of operation of a T&H System, according to another embodiment.
Figure 8:
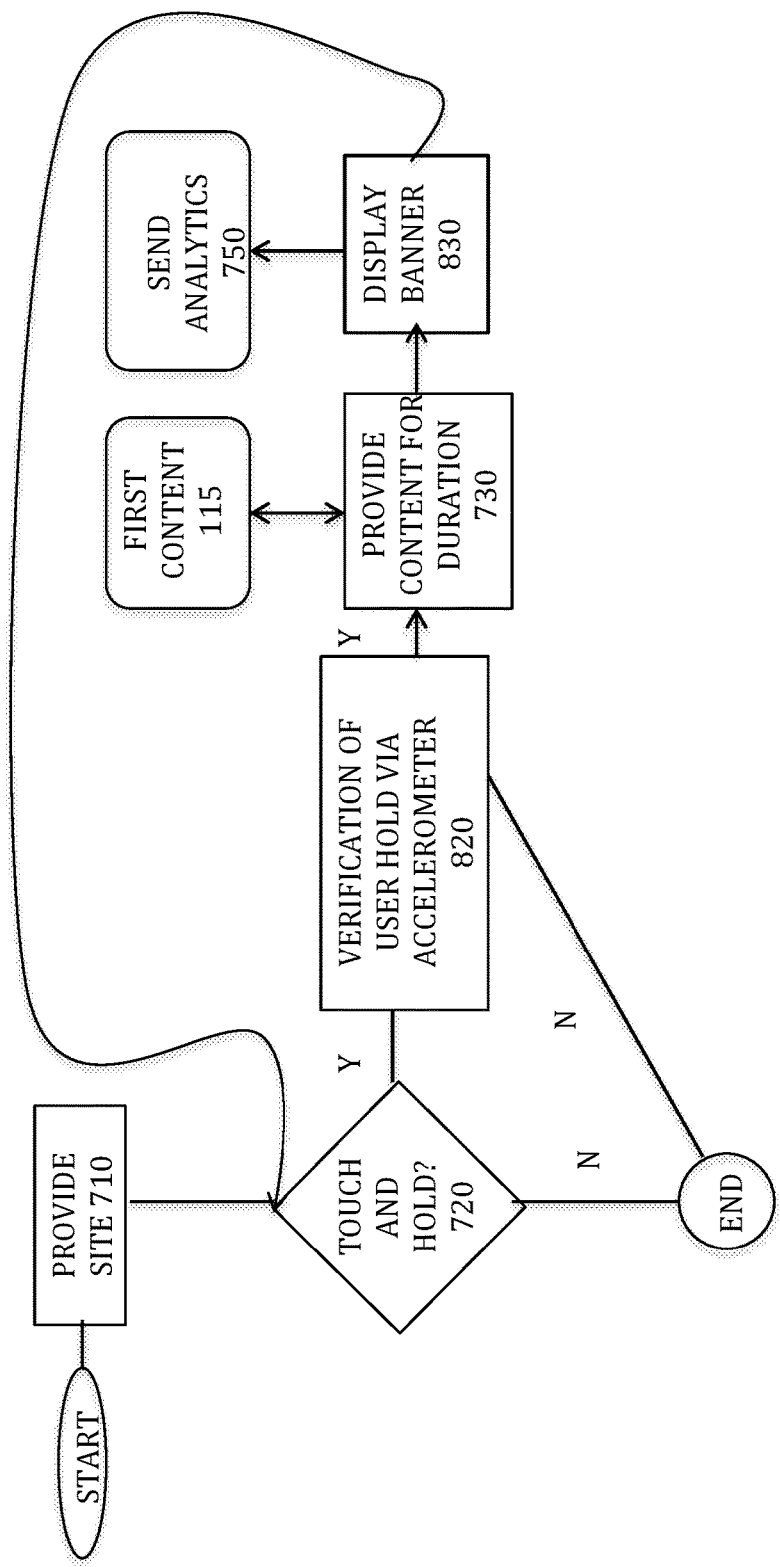
FIG. 8 is a flow chart showing a method of operation of a T&H System, according to another embodiment.

Looking to FIGS. 5-8, there is a method of operation of the interface system 100/T&H system along with a system diagram thereof and an object diagram of an interactive object utilized therewith. Specifically, FIG. 5 is a system diagram of the interface system 100/T&H System, FIG. 6 is a sequence diagram of operation of the interface system 100/T&H System, and FIGS. 7 and 8 are flow charts showing various methods of operation. As previously described above, FIGS. 5-8 variably show the site server 110, the interactive server 120, the user device 150, the content server 130, and an analytics device 140, in functional communication with each other such that they may send and receive functional information therebetween.

Referring specifically to FIG. 6, with secondary reference to FIG. 5, the user device 150 sends a site request 601 to the site server 110. (See also element 510 in FIG. 5). This may be accessing a website, activating an application, or otherwise requesting the first content 530 from the site server 110 over the network 160.

Next, the site server 110 makes a content request 610 from the interactive server 120, sending credentials 540 needed to validate the request 610. This content request 610 may also include data related to the user or other data that the interactive server 120 may use to determine which interactive object 230 to serve back to the site server 110.

The interactive server 120 responds to the content request 610 with an interactive object request 620, which may simply be information request 520 (see FIG. 5) necessary for the user device 150 to request the interactive object 230 from the site server 110 via the interactive object server 120 (e.g., Interactive Object ID and address of Interactive Server 120), or it may be the entire interactive object 230 itself or a portion thereof. The site server 110 then serves the interactive object 230 to the user device 150 for processing at step 630.

Upon receiving the interactive object 230 from the site server 110, at step 640 the user device 150 then requests a banner (e.g., via the banner ID and/or a banner address to the content server 130 (experience server address) or other content package as appropriate from the interactive server 120, as illustrated in FIG. 6. Alternatively, the user device 150 may request the banner from the content server 130. At step 645 of the present embodiment (See also element 550 of FIG. 5), the interactive server 120, upon receiving the banner request from the user device 150, serves the banner to the user device 150 for display.

In further operation of the present embodiment, a user of the user device 150 touches and holds 690 the first interactive object 230 adjacent the first content 115/banner for a duration of time, via a touch-screen interface 210 of the user device 150. During the touch and hold 690 for the duration of time, a content request, based on an Experience Variation Variables (Vars) is made by the user device 150 to the content server 130 at 650, which serves the requested second content 135 at step 660.

After the touch and hold period 690 ends, with user finger 350 being released from contacting the display 153 by the user, at 670 analytics of the user experience are sent from the user device 150 to the analytics device 140 through the Analytics address stored in the interactive object 230. Such analytics may include one or more of the following, or other related data and may be packaged together as a unit of analytic data and stored there as: duration of hold; time of hold; time of release; date of interaction; any associated cookie data for the user and/or user device; device type; device address; content provided; selections made by user prior to, after, and/or during touch and hold; click-through status on transformed banner, and the like, or combinations thereof.

Also, at the conclusion of the touch and hold experience 690, the processor 157 of the user device 150 may change the association of the displayed content secondary interactive object 410/banner with another one or more servers associated therewith, such as but not limited to changing the secondary interactive object 410/banner to link to a third-party landing page associated with the already provided and displayed content object 310. That is, the secondary interactive object 410 may include an association with a new interactive object (Interactive Object N ID) which may be requested by the user device 150 and then served and displayed. There may also be an exit link stored by the second interactive object 410 that is displayed on the user device 150.

In an exemplary application of the embodiment described above, the content object 310, such as an interstitial ad, displayed on the user device 150, such as a mobile phone, is described below. When the user clicks on/touches/opens the content object 310 such as the interstitial mobile ad with the user finger, 350, the user either clicks an "X" to close it, or they are directed to another site altogether. Also, the content object 310 including the above-described ad is opened up by touching the first interactive object 230 that was displayed previously on the user interface 153 before the user finger 350 comes in contact with the user interface 153 such as a logo/banner style ad, but the user must retain physical contact with the user device 150 for the content object 310 to stay open. If the user stops touching the display 153, the content object 310/ad collapses (from interstitial ad size) into a second interactive object 410 with a logo/banner size ad on the original site. This creates an easy "glimpse/preview" of information for the user without leaving the site displayed by the site content 220, and it creates true, proven-human analytics for the advertisers (with analytic proof that the user was in contact with their ad for a predetermined amount of time).

With regard to FIGS. 7 and 8, there are shown two alternative process flows.

In FIG. 7 there is a process for repeatedly replacing banners and serving additional content and then eventually serving a link that takes the user to a landing page or other app/site outside the T&H system. That is, at 710, the site server 110 provides site to the user device 150. The processor 157 on the user device 150 then determines whether a touch and hold procedure has commenced at 720. If no touch and hold procedure has been determined, the process ends. Otherwise, upon determination of the touch and hold procedure, content object 310 is provided for viewing by the user during the duration of the touch and hold procedure at 730. Afterwards, at the touch and hold procedure ends, the ad banner is replaced at 740, and the analytics is sent from the user device 150 to the analytics device 140 and stored in the user interaction data storage device 145 for advertisers' view at 750. The process continues onto 760, where the process determines whether the link associated with the banner or second interactive object 410 should be changed, depending on the analytics gathered stored above, for example. If it is decided that the link should be changed, a new link would be served and be associated with the second interactive object 410 at 790, and the process ends. Otherwise, a touch and hold detection is performed at 770. If no touch and hold is detected, the process ends. Otherwise, if additional touch and hold is detected, the first content 115 is replaced with the second content at 780, and the banner replacement and sending of analytics 740 along with steps 740-790 are repeated.

In FIG. 8 the system simply repeats the display of the same content after the touch and hold procedure ends, but requires that the hold be verified as a human user (Smart Hold) via data collected from the accelerometer 155 or other verification technique. That is, as performed by the processor 157, after the site is provided to the user device 150 by the site server at 710, it is determined at 810 whether a touch and hold procedure has commenced, along with determination by gathering the information from the accelerometer 155 whether the user device 150 is held at a correct angle (Smart hold) at step 820. If it is determined that either there is no touch and hold by the user finger 350 of the user on the user device 150, or that the user device 150 is not being held at an angle from the horizontal plane, the process ends. Otherwise, the content object 350 is provided for display at the user device at 730. Afterwards, the second interactive object 410 is displayed that looks similar to the first interactive object 230. Upon release of the touch and hold, the original banner is displayed at 820, and the analytics information gathered by the user device 150 is sent at 750, and the touch and hold procedure/proper user device holding (i.e., smart hold) determination is repeated at 810.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

As a non-limiting example, while the present application is described in terms of banner ads, which imply commercial advertising uses and contexts, other uses and contexts may apply to the technology described herein, including but not limited to: surveys, fund-raising, employee management, educational, event interaction, compliance testing, entertainment, within games, and/or presentment of terms and conditions.

Further, while examples of content provided through the system are shown in the figures, such content may be in various forms, including but not limited to forms heretofore unknown. Such content may be provided as: video, animation, GIF, 3D animations/objects, games, text, sound, vibration, and/or activation other applications. Also, there may be different content based on the measured angle of inclination, and/or based on custom input scheme (e.g. different ads for different states, IP addresses, geolocations, time of day, etc.).

While it is anticipated that the touch and hold will generally activate for approximately 8-10 seconds, it may operate for any meaningful time range. Further, it may be that content stops after x seconds from let-go. Further there may be a resume button after let-go that allows the user to continue where they left off during the touch and hold. There may be one or more button displayed after the touch and hold that allows the user select from one or more portions of additional content.

Finally, while particular analytics have been discussed, there is plethoric variety in the particular package of analytics that may be tracked through this technology, including but not limited to: duration of hold, which content have the user has seen and/or how much of each, did they click through, how hard did they press, what angle of inclination was the screen and did it change, proof of achievement, and/or proof of viewing of content.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A user interface system, comprising:
  a user device, the user device comprising;
    a processor;
    a display that interacts with the processor to display a user interface including a site content and a first interactive object, wherein
    the processor is operative to
      expand the first interactive object and transform the first interactive object to a content object displayed on the display, when a user touches and holds contact of the display for activation of the first interactive object for a period of time chosen by the user, and
      terminate and contract the content object to transform back for the display to display a second interactive object, the second interactive object having a secondary content trigger, upon the user releasing the contact of the display and the holding by contact for the activation of the first interactive object after the predetermined user-determined period of time,
    the content object includes one of a video or animation, and
    the video or animation stops playing, upon the user releasing the hold by contact for the activation of the first interactive object after the user-determined period of time.

2. The user interface system of claim 1, wherein the site content remains at least partially visible on the display while the first interactive object expands, when the user touches and holds contact of the first interactive object for the user-determined period of time.

3. The user interface system of claim 1, wherein
  the processor is operative to display another content object including one of a video or an animation, when the user touches and holds contact of the secondary content trigger for the user-determined period of time, and
  the one of the video or the animation stops playing upon the user releasing the holding by contact of the other content object.

4. The user interface system of claim 1, wherein
  the user device further includes an accelerometer, and
  the first interactive object expands and transforms the content object upon the user simultaneously touch and hold of the first interactive object for the user-determined period of time, and the accelerometer detecting that the user is holding the user device at a predetermined angle from a horizontal surface perpendicular to a direction of a force of gravity.

5. The user interface system of claim 4, wherein
  the processor is further operative to prevent the expansion and the transformation of the first interactive object while the user is simultaneously touching and holding by contact of the first interactive object for the user-determined period of time, upon occurrence of one of the accelerometer determining one of:
  the user is holding the user device outside of a predetermined angle range; or
  the user device is held by the user without any detected acceleration to the user device over the user-determined period of time.

6. The user interface system of claim 4, wherein the analytic information further includes one of:
  a time when the user releases the holding by contact of the first interactive object;
  additional actions made by the user while touching and holding by contact of the first interactive object; and
  the user's interaction with the secondary content trigger.

7. The user interface system of claim 1, further comprising:
  an analytic device having a user interaction data storage device, wherein
    the processor keeps track of analytic information in association with interactivity with the interactive object via a data storage, and
    the user device is configured to send that stored analytic information including an amount of time the user is touching and holding by contact of the first interactive object to the analytic device, wherein the analytic device stores the received analytic information in the user interaction data storage device, upon the user holding the user device for more than the user-determined period of time.

8. The user interface system of claim 7, wherein
  the processor is further operative to flag the first interactive object, while the user is simultaneously touching and holding by contact of the first interactive object for the user-determined period of time, upon the accelerometer determining one of:
  the user is holding the user device outside of a predetermined angle range; or
  the user device is held by the user without any detected acceleration to the user device over the user-determined period of time.

9. The user interface system of claim 7, wherein the analytic information further includes an amount of time a user touches and holds contact of the user device while holding the user device at a predetermined angle from a horizontal surface perpendicular to a direction of a force of gravity.

10. An advertising method, comprising:
  displaying, by a display, a user interface including a site content and a first interactive object;
  expanding, by the user interface, the first interactive object and transforming the first interactive object into a content object displayed on the display, when a user touches and holds contact of the display for activation of the first interactive object for a user-determined period of time; and
  terminating and contracting, by the user interface, the content object and displaying a second interactive object, the second interactive object having a trigger including a secondary content, upon the user releasing the contact of the display and the holding by contact for the activation of the first interactive object after the user-determined period of time, wherein
    the content object includes one of a video or animation, and
    the video or animation stops playing, upon the user releasing the holding of activation of the first interactive object after the predetermined period of time.

11. The advertising method according to claim 10, wherein
  the site content remains at least partially visible on the display while the first interactive object expands, when the user touches and holds contact of the first interactive object for the user-determined period of time.

12. The advertising method according to claim 10, further comprising:
  displaying, by the display, another content object including one of a video or an animation, when the user touches and holds contact of the secondary content trigger for the user-determined period of time; and
  stopping play, by the user interface, of the one of the video or the animation stops playing upon the user releasing the holding by contact of the other content object.

13. The advertisement method according to claim 10, wherein the one of the video or animation continues to play as long as the user continues to hold by contact of the first interactive object.

14. The advertising method according to claim 10, wherein
  the first interactive object expands and transforms the content object upon simultaneously touching and holding by contact, by a user's finger the first interactive object for the user-determined period of time, and detecting, by an accelerometer, that the user is holding a user device at a predetermined angle from a horizontal surface perpendicular to a direction of a force of gravity.

15. The advertising method according to claim 14, further comprising:
  preventing, by the user interface, the expansion and the transformation of the first interactive object while the user is simultaneously touching and holding by contact of the first interactive object for the user-determined period of time, upon occurrence of one of the accelerometer determining one of:
  the user is holding the user device outside of a predetermined angle range; or
  the user device is held by the user without any detected acceleration to the user device over the user-determined period of time.

16. The advertising method according to claim 14, wherein the analytic information further includes one of:
  a time when the user releases the holding by contact of the first interactive object;
  additional actions made by the user while touching and holding by contact of the first interactive object; and
  the user's interaction with the secondary content trigger.

17. The advertising method according to claim 10, further comprising:
  keeping track, by a processor, of analytic information in association with interactivity with the interactive object; and
  sending, by a user device, the analytic information including an amount of time the user is touching and holding by contact of the first interactive object to the analytic device, wherein
    the analytic device stores the received analytic information in the user interaction data storage device, upon the user holding the user device for more than the user-determined period of time.

18. The advertising method according to claim 17, further comprising
  flagging, by the processor, the first interactive object, while the user is simultaneously touching and holding by contact of the first interactive object for the user-determined period of time, upon determining one of:
    the user is holding the user device outside of a predetermined angle range; or
    the user device is held by the user without any detected acceleration to the user device over the user-determined period of time.

19. The advertising method according to claim 17, wherein the analytic information further includes an amount of time a user touches and holds contact of the user device while holding the user device at a predetermined angle from a horizontal surface perpendicular to a direction of a force of gravity.

* * * * *